United States Patent [19]

Blyakhman

[11] Patent Number: 5,331,068
[45] Date of Patent: Jul. 19, 1994

[54] ADDUCTS OF DIAMINODIPHENYL SULFONE COMPOUNDS AS HARDENERS FOR EPOXY RESINS

[75] Inventor: Yefim Blyakhman, Bronx, N.Y.

[73] Assignee: Ciba-Geigy Corporation, Ardsley, N.Y.

[21] Appl. No.: 109,415

[22] Filed: Aug. 19, 1993

Related U.S. Application Data

[63] Continuation of Ser. No. 11,083, Jan. 29, 1993, abandoned, which is a continuation of Ser. No. 783,452, Oct. 25, 1991, abandoned.

[51] Int. Cl.$^5$ ............... C08G 59/18; C08G 59/24; C08G 59/50
[52] U.S. Cl. .................. 525/523; 525/504; 525/526; 525/533; 528/99; 528/103; 528/109; 528/361; 528/391; 564/325
[58] Field of Search .......... 525/504, 523, 526, 533; 528/99, 103, 109, 361, 391; 564/325

[56] References Cited

U.S. PATENT DOCUMENTS

| | | | |
|---|---|---|---|
| 4,330,644 | 5/1982 | Allen | 525/523 |
| 4,330,659 | 5/1982 | King et al. | 528/99 |
| 4,500,582 | 2/1985 | King et al. | 528/109 |
| 4,568,727 | 2/1986 | Herzog et al. | 528/124 |

FOREIGN PATENT DOCUMENTS 0049687 4/1982 European Pat. Off. .
0193082 9/1986 European Pat. Off. .

OTHER PUBLICATIONS

"Epoxy Resin Technology", Paul F. Bruins, Copyright 1968, John Wiley and Sons, Inc. p. 22.

*Primary Examiner*—Frederick Krass
*Attorney, Agent, or Firm*—JoAnn Villamizar; Luther A. R. Hall; Michele A. Kovaleski

[57] ABSTRACT

The present invention relates to a hardener for polyfunctional epoxy resins comprising the adduct obtained from the reaction of (1) a diaminodiphenyl sulfone of the formula

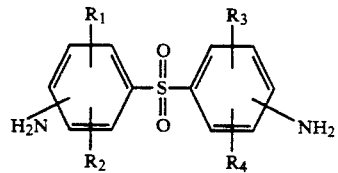

wherein $R_1$, $R_2$, $R_3$ and $R_4$ are independently hydrogen, $C_1$-$C_4$alkyl or halogen and (2) a cycloaliphatic diepoxide at a ratio of aminohydrogen equivalent of said sulfone to said epoxy equivalent of said diepoxide from 2.5:1 to 75:1.

2 Claims, No Drawings

ADDUCTS OF DIAMINODIPHENYL SULFONE COMPOUNDS AS HARDENERS FOR EPOXY RESINS

This is a continuation of application Ser. No. 08/011,083, filed on Jan. 29,1993, now abandoned, which is a continuation of application Ser. No. 07/783,452, Oct. 25, 1991, now abandoned.

BACKGROUND OF THE INVENTION

Adducts of diaminodiphenyl compounds and diglycidyl ethers of polyhydric phenols are described in U.S. Pat. No. 4,330,659. These hardeners for epoxy resins exhibit improved processability in prepregging compared with unmodified diaminodiphenyl sulfones, but suffer from the disadvantage that the cured resins exhibit comparatively low modulus and strength and the decreased thermal performance (i.e. modulus retention at temperatures greater than 100° C.). The melt viscosity of compositions containing the foregoing adducts is considerably higher in comparison to compositions containing the unmodified diaminodiphenyl sulfones. Due to the aforementioned disadvantages, these adducts cannot be used in certain processes such as resin transfer molding or filament winding.

Accordingly, it is a primary object of the present invention to provide a modified hardener system for epoxy resins which overcomes the disadvantages of the prior art unmodified diaminodiphenyl sulfones and the adducts thereof with diglycidyl ethers of polyhydric phenols in accordance with U.S. Pat. No. 4,330,659.

It is a further object of the present invention to provide a modified hardener system for matrix epoxy resins for prepregging, laminating, filament winding and resin transfer molding.

It is a still further object of the present invention to provide a modified hardener system which provides cured epoxy resin systems exhibiting improved modulus, mechanical strength and thermal performance.

Various other objects and advantages of the present invention will become apparent from the following description and examples.

It has now been surprisingly discovered that the reaction product of diaminodiphenyl sulfone and cycloaliphatic diepoxides provides hardeners for epoxy resin systems which epoxy resin system cured therewith exhibit improved performance characteristics, such as modulus and strength retention at 100°–150° C.

SUMMARY OF THE INVENTION

The present invention relates to a hardener for polyfunctional epoxy resins comprising the adduct obtained from the reaction of (1) a diaminodiphenyl sulfone of the formula

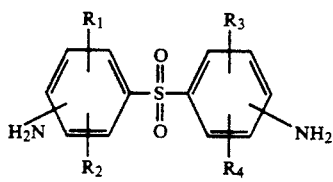

wherein $R_1$, $R_2$, $R_3$ and $R_4$ are independently hydrogen, $C_1$-$C_4$alkyl or halogen and (2) a cycloaliphatic diepoxide at a ratio of aminohydrogen equivalent of said sulfone to said epoxy equivalent of said diepoxide from 2.5:1 to 75:1.

DETAILED DESCRIPTION OF THE INVENTION

The modified hardeners of the present invention are prepared by reacting cycloaliphatic epoxy resins with a diaminodiphenyl sulfone compound.

Suitable diaminodiphenyl sulfones are of the formula

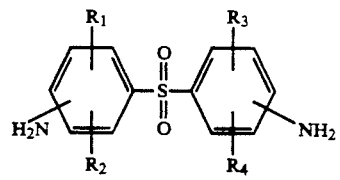

wherein $R_1$, $R_2$, $R_3$ and $R_4$ are independently hydrogen, $C_1$-$C_4$alkyl or halogen. Preferably, $R_1$, $R_2$, $R_3$ and $R_4$ are independently $C_1$-$C_4$alkyl, most preferably, methyl or ethyl, or halogen, most preferably, chlorine, bromine or fluorine. Commercially available sulfones include the 4,4'-, 2,4'- and 3,3'-diaminodiphenyl sulfones. The preferred sulfone is 3,3'-diaminodiphenyl sulfone.

Suitable cycloaliphatic epoxy resins are diepoxides having at least one epoxy group attached to the cycloaliphatic moiety, selected from the group consisting of vinyl-cyclohexene dioxide, 7-oxabicyclheptane-3-carboxylic acid, 7-oxa-bicyclohept-3-ylmethyl ester, bis(3,4-epoxycyclohexylmethyl)adipate, 3,4-epoxycyclohexyloxirane, 2-(3',4'-epoxycyclohexyl)-5,1''-spiro-3'',4''-epoxycyclohexane-1,3-dioxane. Examples of commercially available cycloaliphatic diepoxides are 7-oxabicyclheptane-3-carboxylic acid, 7-oxa-bicyclohept-3-ylmethyl ester (e.g. CY-179® from CIBA-GEIGY Corporation, Ardsley, N.Y.), vinyl-cyclohexene dioxide (e.g. ERL 4206® from Union Carbide Corporation, Danbury, Conn.) and cycloaliphatic diepoxide having a spiro structure, for example 2-(3',4'-epoxy cyclohexyl)-5,1''-spiro-3'',4'-epoxycyclohexane-1,3-dioxane (ERL 4234® from Union Carbide Corporation, Danbury, Conn.). The structures of these cycloaliphatic diepoxides are shown below:

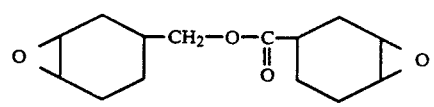

CY 179

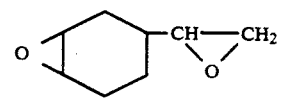

ERL 4206

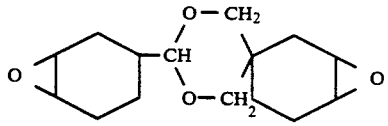

ERL 4234

The hardeners of the present invention are prepared by admixing the diaminodiphenyl sulfone compound with the cycloaliphatic epoxy resin and heating the mixture at about 140°–220° C., preferably at 170°–190° C. for about 1–8 hours, preferably about 2–3 hours. The reaction can be carried out in solution (applicable solvents include ketones, esters, ethers and the like) with subsequent removal of the solvent by evaporation.

Ratios of aminohydrogen equivalent of the diaminodiphenyl sulfone to the epoxy group equivalent of cycloaliphatic epoxy resin are in the range of about 2.5:1 to 75:1, preferably about 5:1 to 15:1.

The diaminodiphenyl sulfone adducts of this invention are suitable as hardeners for epoxy resins selected from a broad range of aliphatic and aromatic epoxies having a functionality of at least two. Typical materials include glycidylated hydantoin epoxy resins, amino phenol epoxy resins, aromatic amine epoxy resins, polyglycidyl esters, cycloaliphatic epoxy resins, tetraglycidylated methylene dianiline derivatives, diglycidyl ether of bisphenol A, epoxy phenol novolacs, 1,4-butane diol diglycidyl ether, epoxy cresol novolacs, trimethylolpropane triglycidyl ether, triglycidyl tris(p-hydroxyphenyl)methane, tetraglycidyl-1,1,2,2 tetrakis (p-hydroxyphenyl)ethane, vinyl cyclohexene dioxide, $N,N,N^1,N^1$-tetraglycidyl-4,4$^1$-methylene bis-benzeneamine, $N,N,N^1,N^1$-tetraglycidyl metaxylene diamine, diglycidyl aniline, resorcinol diglycidyl ether, the diglycidyl ethers of catechol, hydroquinone, and the like, diglycidyl ortho-toluidine, diglycidyl isophthalate, bisphenol A, F or S epoxy resins, triglycidyl isocyanurate, and $N,N,N^1,N_1$-tetraglycidyl 1,3 bis-amino-methylcyclohexane. The various ethers may be substituted on the respective phenyl rings by such non-reactive substituents as alkyl, halogen, and the like. Tetraglycidylated methylene dianiline derivatives are preferred. The preparation of such materials is well-known in the art.

The hardener is present in epoxy resin compositions in accordance with the present invention in stoichiometric amounts ±50% relative to the epoxy resin component, with 85-100% of stoichiometry being preferred.

The epoxy resin compositions of the invention may also contain other conventional modifiers such as extenders, fillers and reinforcing agents, pigments, dyestuffs, organic solvents, plasticizers, tackifiers, rubbers, diluents, and the like. As extenders, reinforcing agents, fillers and pigments which can be employed in the compositions according to the invention there may be mentioned, for example: glass fibers, glass balloons, boron fibers, carbon fibers, cellulose, polyethylene powder, polypropylene powder, mica, asbestos, quartz powder, gypsum, antimony trioxide, bentones, talc, silica aerogel ("Aerosil"), fumed silica, lithopone, barite, calcium carbonate, titanium dioxide, carbon black, graphite, iron oxide, or metal powders such as aluminum powder or iron powder. It is also possible to add other usual additives, for example, agents for conferring thixotropy, flow control agents such as silicones, cellulose acetate butyrate, polyvinyl butyral, stearates and the like.

A vertical type high-speed agitator, kneading machine, roll machine, ball mill or any other suitable mixing and agitating machine may be used for dispersion of the components of the composition of the present invention.

The compositions of the present invention are suitable for use in various heat cured applications, such as resin transfer molding or filament winding. Additionally, such compositions are useful as matrix resins for composites, adhesives, coatings, molding, casting and the like.

The following examples serve to give specific illustrations of the practice of this invention but they are not intended in any way to limit the scope of this invention.

EXAMPLE 1

This example illustrates the preparation of a typical hardener of the present invention.

A 1 liter flask is charged with 100 g of cycloaliphatic epoxy resin, CY 179 ® from CIBA-GEIGY Corporation, Ardsley, N.Y. The resin is heated to 140° C. under nitrogen. 600 g of 3,3'-diaminodiphenyl sulfone (13:1 amine: epoxy equivalent ratio) is added in alliquots over 1 hour with stirring while maintaining the temperature of the reaction mixture at 145°–155° C. The mixture is then heated to 180° C. and maintained at 180°–185° C. for 3 hours. The resulting product is a transparent amorphous solid resin having a Tg of 46° C. (DSC) and melting point of 76° C. FTIR shows no epoxy groups in the product. Determination of amino groups by titration with perchloric acid in acetic acid solutions shows 98.7 of theoretical amount (calculated amino equivalent of the reaction product is 78, e.g. one aminohydrogen in 78 g of the product). The adduct has a viscosity of 2,370 cps at 125° C. and 380 cps at 150° C. (Brookfield).

100 pans of tetraglycidylated 4,4'-diamino-3,3'-diethyldiphenyl methane (MY 722 ® Epoxy resin from CIBA-GEIGY Corporation, Ardsley, N.Y.) is mixed with 54.3 parts of the modified diaminodiphenyl sulfone prepared above (1:0.87 epoxy:amine equivalent ratio). The mixture is stirred at 100°–110° C. until the hardener is completely dissolved and then degasseal at 110°–120° C. under vacuum (3 mmHg). The resulting mixture has a viscosity of 340 cps at 100° C. The mixture is poured in a mold and cured at 177° C. for 6 hours. The cured resin is characterized by Dynamic Mechanical Analysis (DMA) using a DuPont 983 Dynamic Mechanical Analyzer. Sample dimensions are 12.7 mm wide × 76.0 mm long × 3.2 mm thick. Samples are heated from 30° C. to 350° at 10° C./min under nitrogen. Modulus retention as a function of temperature is measured under dry and wet (48 hours in boiling water prior to testing) conditions. Tg (dry and hot/wet) is determined as E'' peak temperature. Flexural and tensile properties are tested according to ASTM D790 and D638, respectively.

Control Sample #1 is obtained by curing epoxy resin MY 722 with 3,3'-diaminodiphenyl sulfone using a 1:0.87 epoxy-amine ratio at 177° for 6 hours. Data on properties of tetraglycidated methylene dianiline (epoxy resin MY720) cured with 4,4-diaminodiphenyl sulfone modified with diglycidyl ether of Bisphenol A (1:0.87 epoxy:amine equivalent ratio) in accordance with the teachings of U.S. Pat. No. 4,330,659 (Control Samples #2) are presented as well for comparison in Table 1.

The data in Table 1 illustrates the significant increase in modulus and, especially in flexural strength for the resin cured with the diaminodiphenyl sulfone modified by cycloaliphatic diepoxide in accordance with the present invention. Modulus retention under hot/wet conditions is also considerably higher for the latter.

TABLE 1

| | Cured resins properties | | |
|---|---|---|---|
| | Resin System | | |
| Property | Example 1 | Control Sample #1 | Control Sample #2 |
| Tg, °C. Dry | 230 | 230 | 174–204 |
| Wet | 196 | 198 | |
| DMA Modulus, Kpsi | | | |
| at 30° C. dry/wet | 653/600 | 650/580 | |
| at 120° C. dry/wet | 539/473 | 530/435 | |
| Flexural Strength, Kpsi | 25.5 | 19.7 | 17.0–20.0 |

TABLE 1-continued

| | Cured resins properties | | |
|---|---|---|---|
| | Resin System | | |
| Property | Example 1 | Control Sample #1 | Control Sample #2 |
| Modulus | 682 | 621 | 460–530 |
| Tensile strength, Kpsi | 9.4 | 8.2 | 8.5–11.0 |
| Modulus | 670 | 625 | 500–540 |
| Elongation, % | 1.6 | 1.5 | 1.5–2.8 |

EXAMPLES 2–4

These examples illustrate the preparation of other typical hardeners of the present invention.

Adducts of 3,3'-diaminodiphenyl sulfone and cycloaliphatic epoxy resin CY-179 with various ratios of the components are prepared using the procedure of Example 1. Data on properties of the adducts of Examples 2–4 and MY 722 ® epoxy resin (from CIBA-GEIGY Corporation, Ardsley, N.Y.) cured with the adducts are presented in Tables 2 and 3, respectively. The data shows that epoxy compositions containing the hardeners of this invention exhibit good processability (low viscosity of resin-hardener mixtures), high modulus and strength, and high modulus retention under hot/wet conditions up to 150° C.

TABLE 2

Properties of the adducts of 3,3'-diaminodiphenyl sulfone (DDS) and cycloaliphatic epoxy resin CY-179 ®

| | Example 2 | Example 3 | Example 4 |
|---|---|---|---|
| | WEIGHT RATIO DDS:CY-179 ® | | |
| | Amine:epoxy equivalent ratio | | |
| Property | 7:1/15.2:1 | 5:1/11:1 | 4:1/8.8:1 |
| Tg, °C. (DSC) | 45 | 49 | 61 |
| Viscosity at 125° C., cps | 1,700 | 4,840 | — |
| At 150° C. | — | 500 | 1,070 |
| Reactivity with MY-722 epoxy resin | | | |
| Reaction onset temp. °C. | 203 | 198 | 196 |
| Reaction peak temp. °C. | 253 | 250 | 244 |
| Gel-time at 177° C., min | 29 | 33 | 32 |
| Viscosity of MY-722 adduct mixture, cps at 100° C. | 240 | 700 | 1,380 |

TABLE 3

Properties of MY-722 epoxy resin cured with the adducts of Examples 2–4.

| Property | Example 2 | Example 3 | Example 4 |
|---|---|---|---|
| Tg Dry/wet, °C. | 220/189 | 227/194 | 219/186 |
| DMA Modulus, Dry/Wet kpsi | | | |
| at 30° C. | 609/560 | 656/604 | 644/595 |
| 120° C. | 507/447 | 542/479 | 523/461 |
| 150° C. | 461/383 | 491/410 | 472/386 |
| Flexural Modulus, kpsi | 580 | 688 | 566 |
| Strength | 20 | 24.5 | 20.7 |
| Tensile Modulus, kpsi | 563 | 674 | 608 |
| Strength | 1.5 | 1.4 | 1.6 |
| Elongation, % | 1.5 | 1.4 | 1.6 |

EXAMPLES 5 and 6

Mixtures of 4,4'-diaminodiphenyl sulfone (4,4' DDS) and cycloaliphatic diepoxide CY-179 at weight ratio 6:1 (Example 5) and 5:1 (Example 6) are heated at 195°–200° C. under N₂ with stirring for 2 hours. Properties of the resulting adducts are presented in Table 4.

TABLE 4

Properties of the adducts of 4,4'-diaminodiphenyl sulfone (4,4'-DDS) and cycloaliphatic epoxy resin CY-179

| Property | Example 5 Amine:epoxy equivalent ratio 13:1 | Example 6 Amine:epoxy equivalent ratio 11:1 |
|---|---|---|
| Tg, °C. (DSC) | 61 | 72 |
| Viscosity, cps | | |
| at 125° C. | 17,400 | 53,100 |
| 150° C. | 1,040 | 2,290 |
| Reactivity with MY 722 epoxy resin | | |
| Reaction onset temp. °C. | 215 | 217 |
| Reaction peak temp. °C. | 261 | 265 |
| Gel-time at 177° C., min | 48 | 46 |

EXAMPLE 7

A mixture of 3,3'-diaminodiphenyl sulfone and vinylcyclohexene dioxide (Union Carbide epoxy resin ERL 4206) at 7:1 weight ratio (8:1 amine:epoxy equivalent ratio) is heated at 175°–180° under N₂ with stirring for 3 hours. The resulting amorphous transparent glassy solid has a Tg of 47° C. 50 g of the adduct are dissolved in 100 g of epoxy resin MY 722 ® at 90° C. The resulting mixture exhibits a viscosity of 350 cps at 100° and Gel Time of 28 min at 177° C. Properties of the cured resin (177° C., 6 hours) are presented in Table 5.

TABLE 5

Properties of MY 722 epoxy resin cured with the adduct of 3,3'-diaminodiphenyl sulfone and cycloaliphatic epoxy resin ERL 4206 (Example 7)

| Property | |
|---|---|
| Tg °C., dry/wet | 225/196 |
| DMA Modulus dry/wet | |
| at 30° C. | 648/625 |
| 120° C. | 520/485 |
| 150° C. | 464/414 |
| Flexural Modulus, Kpsi | 760 |
| strength | 27.8 |
| Tensile Modulus, Kpsi | 665 |
| Strength | 9.0 |
| Elongation, % | 1.5 |

EXAMPLES 8 AND 9

Mixtures of 3,3'-diaminodiphenyl sulfone and epoxy resin ERL 4234 (Union Carbide) at weight ratio 6:1 (Example 8) and 4:1 (Example 9) are heated at 185°–195° C. under N₂ with stirring for 3 hours. Properties of the obtained adducts are presented in Table 6 and properties of cured MY 722 ® epoxy resin using these adducts (cure cycle 177° C. for 6 hours) are presented in Table 7. The data shows that the cured resin has extremely high flexural modulus and strength, high tensile modulus and excellent modulus retention.

TABLE 6

Properties of the adducts of 3,3'-diaminodiphenyl sulfone and cycloaliphatic epoxy resin ERL 4234

| Property | Example 8 Amine:epoxy equivalent ratio 14.2:1 | Example 9 Amine:epoxy equivalent ratio 9:1 |
|---|---|---|
| Tg, °C. (DSC) | 48 | 53 |
| Viscosity at 125° C., cps | 1,500 | — |
| Reactivity with MY 722 epoxy resin | | |
| Reaction onset temp. °C. | 203 | 196 |
| Reaction peak temp. °C. | 250 | 245 |

TABLE 6-continued

Properties of the adducts of 3,3'-diaminodiphenyl sulfone and cycloaliphatic epoxy resin ERL 4234

| Property | Example 8 Amine:epoxy equivalent ratio 14.2:1 | Example 9 Amine:epoxy equivalent ratio 9:1 |
| --- | --- | --- |
| Gel-time at 177° C., min | 27.5 | 16.3 |
| Viscosity of MY-722-adduct mixture, cps | | |
| at 100° C. | 330 | 4,700 |
| 125° C. | 210 | 1,100 |

TABLE 7

Properties of MY 722 epoxy resin cured with the adducts of Examples 8-9

| Property | Example 8 | Example 9 |
| --- | --- | --- |
| Tg Dry/Wet, °C. | 230/199 | 230/196 |
| DMA Modulus, Dry/Wet Kpsi | | |
| at 30° C. | 641/602 | 663/622 |
| 120° C. | 516/468 | 542/483 |
| 150° C. | 461/400 | 488/413 |
| Flexural modulus, Kpsi | 759 | 767 |
| strength | 28.5 | 29.3 |
| Tensile modulus, Kpsi | 680 | 696 |
| strength | 8.1 | 10.5 |
| Elongation, % | 1.3 | 1.7 |

What is claimed is:

1. A hardener for polyfunctional epoxy resins comprising the adduct of 3,3'-diaminodiphenylsulfone and a cycloaliphatic diepoxide wherein the ratio of aminohydrogen equivalent of said sulfone to epoxy equivalent of said diepoxide is from 8:1 to 15.2:1.

2. The hardener of claim 1 wherein said cycloaliphatic diepoxide is selected from the group consisting of vinyl-cyclohexene dioxide, 7-oxabicycloheptane-3-carboxylic acid 7-oxa-bicyclohept-3-ylmethyl ester, 3',4'-epoxycyclohexylmethyl-3,4-epoxycyclohexane carboxylate, bis(3,4-epoxycyclohexylmethyl)adipate, 3,4-epoxycyclohexyloxirane, and 2-(3',4'-epoxycyclohexyl)-5,1''-spiro-3'',4''-epoxycyclohexane-1,3-dioxane.

* * * * *